United States Patent
Iwashita

(10) Patent No.: US 7,400,063 B2
(45) Date of Patent: Jul. 15, 2008

(54) SWITCHED-MODE POWER SUPPLY

(75) Inventor: Yasuhiro Iwashita, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 553 days.

(21) Appl. No.: 10/714,893

(22) Filed: Nov. 18, 2003

(65) Prior Publication Data

US 2004/0100740 A1    May 27, 2004

(30) Foreign Application Priority Data

Nov. 27, 2002    (JP)    ............... 2002-344537

(51) Int. Cl.
*H02J 1/00*    (2006.01)
(52) U.S. Cl. .......................... 307/31; 307/39
(58) Field of Classification Search .................... 307/31, 307/11, 39, 33; 361/18, 78, 90, 56
See application file for complete search history.

(56) References Cited

U.S. PATENT DOCUMENTS

| | | | | |
|---|---|---|---|---|
| 4,236,198 A | * | 11/1980 | Ohsawa et al. | ................. 363/49 |
| 5,450,308 A | * | 9/1995 | Tai | ................. 363/57 |
| 5,541,828 A | * | 7/1996 | Rozman | ................. 363/21.1 |
| 5,933,049 A | * | 8/1999 | Melse | ................. 363/21.13 |
| 6,211,579 B1 | * | 4/2001 | Blair | ................. 307/24 |
| 6,724,175 B1 | | 4/2004 | Matsuda et al. | |

FOREIGN PATENT DOCUMENTS

| | | |
|---|---|---|
| JP | 63-198386 | 12/1988 |
| JP | 08-163866 | 6/1996 |
| JP | 8-228477 A | 9/1996 |
| JP | 2001-025238 | 1/2001 |
| JP | 2001-268899 | 9/2001 |
| JP | 2002-281757 | 9/2002 |

* cited by examiner

*Primary Examiner*—Michael J Sherry
*Assistant Examiner*—Daniel Cavallari
(74) *Attorney, Agent, or Firm*—Birch, Stewart, Kolasch & Birch, LLP

(57) ABSTRACT

The switched-mode power supply includes an output value sensor circuit measuring a current flow through a switching device and a switching control circuit implementing overcurrent protection. Also included in the power supply are: a second output voltage sensor circuit detecting a high output voltage for the second load; and a short-circuit device quasi-shorting the terminals of the second load when the detected value of the voltage is more than or equal to a specific value. Therefore, if the short-circuit device shorts out, the secondary load increases, and the output for the relatively low load can be restrained by overcurrent protection. Thus, a reliable overcurrent protection can be achieved using a simple construction by means of cross-regulation.

10 Claims, 6 Drawing Sheets

SWITCHED-MODE POWER SUPPLY

This nonprovisional application claims priority under 35 U.S.C. § 119(a) on Patent Application No. 344537/2002 filed in JAPAN on Nov. 27, 2002, the entire contents of which is herein incorporated by reference.

FIELD OF THE INVENTION

The present invention relates to switch mode power supplies, in particular, those with multiple secondary circuits.

BACKGROUND OF THE INVENTION

FIG. 6 is a block diagram showing an electrical construction of a typical conventional switched-mode power supply 1. The power supply 1 supplies multiple loads 11, 12 as multiple secondary circuits with desired constant output voltages vo1, vo2 respectively.

As shown in the figure, in the power supply 1, the AC voltage (AC power) taken from, for example, a commercial power source 2, is fed to the AC input section. The AC voltage is then passed through a rectifier diode d0 and a smoothing capacitor c0 to transform it to a DC voltage on which the power supply 1 itself will operate (alternatively, the power supply 1 may be arranged to operate on a battery or other DC power source).

Still referring to FIG. 6, in the power supply 1, the smoothing capacitor c0 is provided across a switching device q and the primary winding 3a of a transformer 3 which are connected in series.

The series circuit stores magnetic energy in the primary winding 3a when the switching device q is on. The energy is then drawn from the first secondary winding 3b of the transformer 3 through the rectifier diode d1 and smoothed by the smoothing capacitor c1 when the device q goes off. The actions produce a relatively low power (low consumption) output to the first load 11 at the output voltage vo1 of a relatively low value.

In the power supply 1, the output voltage sensor circuit 4 detects the output voltage (DC output voltage) vo1 and provides the result as a feedback to the primary-side switching control circuit 5 through a photocoupler and other devices (not shown in the figure) disposed for insulating purposes. The switching control circuit 5 controls the switching action according to the magnitude of the output voltage vo1 to regulate the output voltage (supply voltage) vo1.

Still referring to FIG. 6, in the power supply 1, DC power is drawn also from the second secondary winding 3c of the transformer 3 through a rectifier diode d2 and smoothed by a smoothing capacitor c2 when the switching device q is off. The actions produce a relatively high power (low consumption) output to the second load 12 at the output voltage vo2 of a relatively high value.

The power supply 1 is adapted to provide the relatively low output voltage vo1 as a feedback to the switching control circuit 5, because the first load 11 to which is supplied a lower voltage is a kind of load that requires the output voltage vo1 to be highly precise and that needs to be fed with the output voltage vo1 even when the electronics are standing by (e.g., microcomputer), whereas the second load 12 to which is supplied a higher voltage is a kind of load that can operate on the less precise output voltage vo2 and that does not need to be fed with the output voltage vo2 when the electronics are standing by (e.g., a motor). Exemplary electronic devices with such two power outputs are printers, copying machines, facsimiles, and other like printing machines.

Still referring to FIG. 6, in the primary side of the power supply 1, there is provided an output value sensor circuit 6 detecting the current flow through the switching device q. The output value sensor circuit 6 senses a voltage value which is in proportion to the total power output (total power) to the secondary circuits (voltage drops, etc. by a resistor (not shown in the figure) and other components connected in series with the device q). The result is given to the switching control circuit 5. This enables the power supply 1 to provide overcurrent protection to the secondary circuits.

Thus, the power supply 1 is adapted to implement overcurrent protection, depending on a value in proportion with the total power output to the secondary circuits.

Suppose, for example, that the first load 11, to which is supplied a lower voltage, requires an electric power at 3.3 V, 5 A, and also that the second load 12, to which is supplied a higher voltage, requires an electric power at 24 V, 2 A. The total power output to the secondary circuits is 3.3×5+24×2=64.5 W. Note that we ignore various power dissipations including the forward voltage drops by the diodes d1, d2 for simple description.

Suppose further that settings are made so that overcurrent protection is activated when the total power output to the secondary circuits reaches 65 W. In this situation, overcurrent protection starts when the current flow through the first load 11 reaches 65/3.3=19.7 A if the high power consuming second load 12 is small (for example, there is no second load 12 or its resistance is extremely high).

In this manner, in the power supply 1, if the second load 12, to which is supplied a higher voltage, is provided with a low power supply, the current flow through the first load 11, to which is supplied a lower voltage, becomes as high as 19.7 A, far exceeding its rating (5 A), before overcurrent protection starts. To avoid such overcurrent, changes should be made to the design: for example, the DC resistance may be lowered, the current rating of the rectifier diode d1 constituting one of the secondary circuits may be increased, or the cross-section of the second secondary winding 3b of the transformer 3 may be increased. Any of the changes can be made only at an additional cost.

The problems can be addressed also by an individual current sensor circuit connected to each of the secondaries' outputs. However, the arrangement inevitably requires that the outputs be terminated or controlled independently from each other based on the two detected current values or together by feeding both the values to the primary. The circuit therefore becomes complex and induces additional cost as in the previous case.

SUMMARY OF THE INVENTION

Conceived to solve the foregoing conventional problems, the present invention has an object to provide a switched-mode power supply with a reliable overcurrent protect capability at low cost.

A switched-mode power supply in accordance with the present invention includes: a primary circuit including a primary winding and a switching device, the primary winding constituting a part of a transformer; and multiple secondary circuits each including a secondary winding and a load, the secondary windings constituting a part of the transformer, the switching device turning on/off an electric power supply to the primary winding to produce secondary electric powers applied from the multiple secondary windings to the loads. The switched-mode power supply includes: a specified-voltage sensor section for detecting an output voltage from a specified one of the secondary circuits; and an output limiting section for limiting an electric power output to another one or more of the secondary circuits when the specified-voltage sensor section has detected a voltage more than or equal to a predefined value.

The power supply is part of electronics in printers, copying machines, facsimiles, or like printing devices. It powers such electronics at two or more different power levels.

The power supply directs external DC power through a switching device to a primary winding which makes up a part of a transformer in a primary circuit. The power supply then transfer magnetic energy stored in the primary winding to multiple secondary circuits each including a load and a secondary winding of the transformer.

The external DC power may be either produced by rectifying and smoothing external AC power or drawn directly from, for example, a battery. The load in the secondary circuit is, for example, an electronic device to which the power supply is connected.

A feature of the power supply is the inclusion of a specified-voltage sensor section in a specified one of the secondary circuits. The specified-voltage sensor section detects the voltage of the output electric power (output voltage) to that circuit. The power supply further includes an output limiting section for limiting the output electric power to another one or more of the secondary circuits when the specified-voltage sensor section has detected an output voltage (detected voltage) more than or equal to a predefined value.

As a result, in the arrangement involving multiple secondary circuits like that of the power supply, variations in the balance among the output currents to the secondary circuits causes changes in the output voltages to the secondary circuits. (cross-regulation occurs). For example, when the load in the specified secondary circuit becomes lighter (more resistive), the output voltage to the specified secondary circuit rises, which may possibly trigger overcurrent in another secondary circuit due to cross-regulation.

The power supply prevents overcurrent in the other secondary circuit using the specified-voltage sensor section and the output limiting section.

More specifically, when the output voltage to the specified secondary circuit has risen due to cross-regulation, the power supply detects the rise of the output voltage using the specified-voltage sensor section. If the voltage value as detected by the specified-voltage sensor section has reached or exceeded a predefined value, the output limiting section limits the output electric power to the other secondary circuit. The power supply is hence capable of preventing electric current rises in the other secondary circuit.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

An embodiment of the present invention will be described.

A switched-mode power supply in accordance with the present embodiment supplies loads L1, L2 with desired constant output voltages Vo1, Vo2 respectively as in the foregoing cases.

Figure 1:
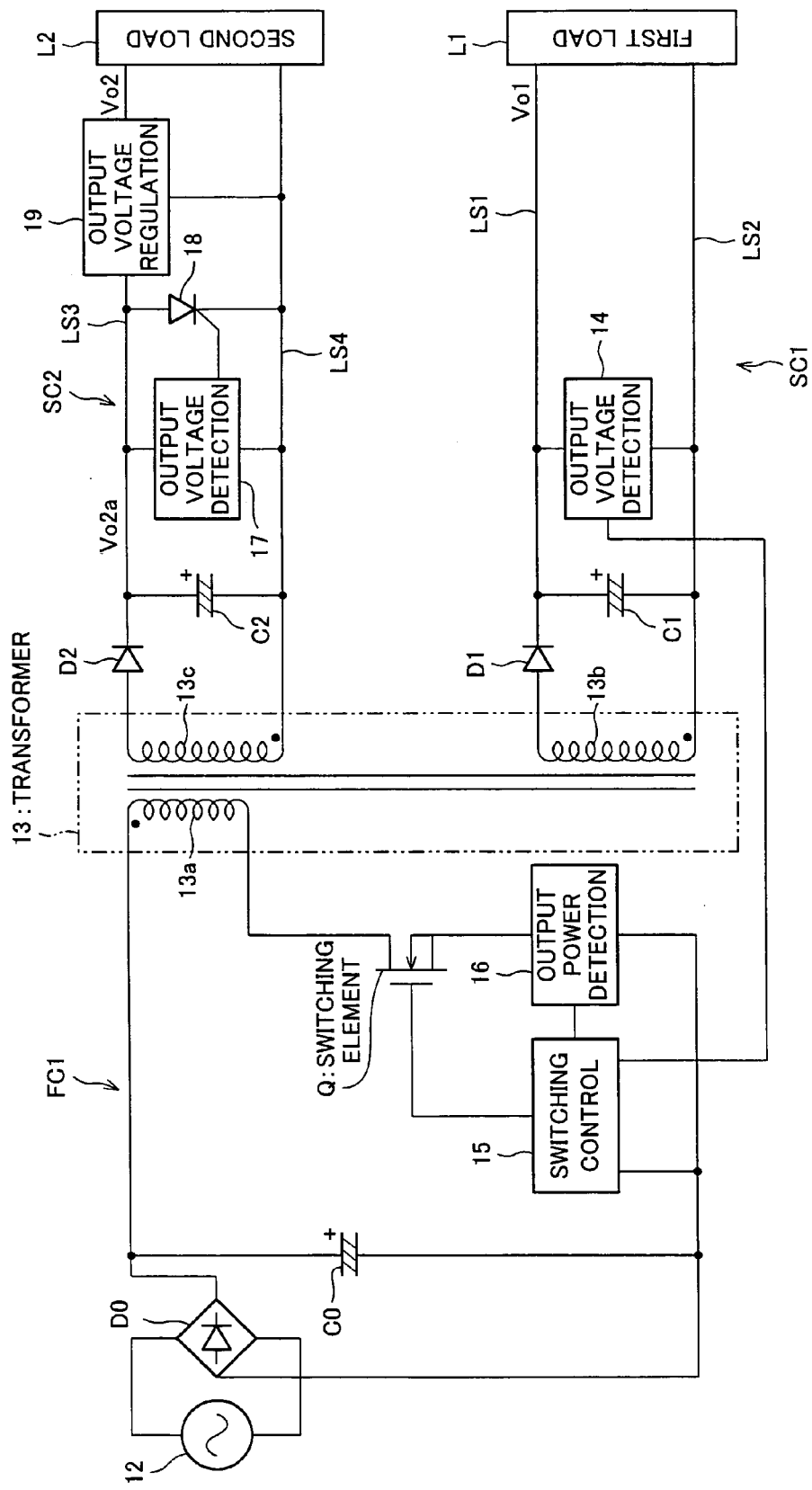
FIG. 1 is a block diagram showing an electrical construction of a switched-mode power supply in accordance with an embodiment of the present invention.

FIG. 1 is a block diagram showing an electrical construction of the power supply. As illustrated in the figure, the power supply includes a primary circuit FC1 and two secondary circuits SC1, SC2 (first secondary circuit SC1 and second secondary circuit SC2) which together form a transformer 13.

The power supply is adapted to supply the first load L1 in the first secondary circuit SC1 with relatively low electric power (first electric power) and at a relatively low voltage Vo1 (the first load L1 dissipates less power). On the other hand, the power supply is adapted to supply the second load L2 in the second secondary circuit SC2 with relatively high electric power (second electric power) and at a relatively high voltage Vo2 (the second load L2 dissipates more power).

First, the construction of the power supply will be described.

As shown in FIG. 1, the primary circuit FC1 includes a rectifier diode D0, a smoothing capacitor C0, a primary winding 13a, a switching device Q, a first output voltage sensor circuit 14, a switching control circuit 15, and a total power sensor circuit 16.

The rectifier diode D0 and the smoothing capacitor C0 transforms AC power taken from a commercial power source 12 to DC power as the power source (voltage source) for the power supply.

The primary winding 13a is a primary winding of the transformer 13. The switching device Q is a switch to initiate or terminate electric power supply to the secondary circuits SC1, SC2.

Still referring to FIG. 1, the primary winding 13a and the switching device Q are connected in series across the smoothing capacitor C0. In other words, the primary winding 13a and the switching device Q form a series circuit across the smoothing capacitor C0.

The switching control circuit (control section) 15 turns on/off the switching device Q (closes/opens the switching device Q).

The total power sensor circuit 16 measures a voltage drop across a resistor (not shown in the figure) connected in series with the switching device Q and sends the result to the switching control circuit 15. The voltage drop is in proportion to the current flow through the switching device Q and also to the total power output (the sum of secondary power outputs) to the secondary circuits SC1, SC2 (total secondary power).

Still referring to FIG. 1, the first secondary circuit SC1 includes a first secondary winding 13b, a rectifier diode D1, a smoothing capacitor C1, the first output voltage sensor circuit 14, and the first load L1.

The first secondary winding 13b is a secondary winding of the transformer 13, connected in series with the rectifier diode D1 and the first load L1 to form a closed circuit. The output line LS1 in FIG. 1 connects the rectifier diode D1 to the first load L1, whereas the output line LS2 connects the first secondary winding 13b to the first load L1.

The smoothing capacitor C1 and the first output voltage sensor circuit 14 are disposed in parallel between the output lines LS1, LS2.

The rectifier diode D1 and the smoothing capacitor C1 smooth the electric power drawn from the first secondary winding 13b for output to the first load L1 through the output line LS1.

The first output voltage sensor circuit (other output voltage sensor section) 14 detects the voltage (DC output voltage) Vo1 of the electric power output to the first load L1 and provides the result as a feedback to the switching control circuit 15 through a photocoupler and other devices (not shown in the figure) disposed for insulating purposes.

As shown in FIG. 1, the second secondary circuit (specified secondary circuit) SC2 includes a second secondary winding 13c, a rectifier diode D2, a smoothing capacitor C2, a second output voltage sensor circuit 17, a short-circuit device 18, an output voltage regulator circuit 19, and the second load L2.

Similarly to the first secondary winding 13b, the second secondary winding 13c is a secondary winding, of the transformer 13, connected in series with the rectifier diode D2 and the second load L2 to form a closed circuit.

The output line LS3 in FIG. 1 connects the rectifier diode D2 to the output voltage regulator circuit 19, whereas the output line LS4 connects the second secondary winding 13c to the second load L2.

The smoothing capacitor C2, the second output voltage sensor circuit (specified-voltage sensor circuit) 17, and the short-circuit device 18 are disposed in parallel between the output lines LS3, LS4.

The rectifier diode D2 and the smoothing capacitor C2 smooth the electric power drawn from the second secondary winding 13c for output to the output voltage regulator circuit 19 through the output line LS3.

Here, as shown in FIG. 1, the potential difference between those parts of the output lines LS3, LS4 which directly link the rectifier diode D2 and the smoothing capacitor C2 with the output voltage regulator circuit 19 (i.e., the voltage across the second output voltage sensor circuit 17 and the short-circuit device 18) is designated an output voltage Vo2a.

Supplied with an electric power at the output voltage Vo2a, the output voltage regulator circuit 19 between the output lines LS3, LS4 adjusts the voltage so that the second load L2 can stably receive an electric power at the constant output voltage Vo2.

The short-circuit device 18 is a thyristor quasi-shorting the output line LS3 to the output line LS4 when turned on.

Let us define "quasi-shorting" by the short-circuit device 18. When turned on, the short-circuit device 18 remains in that state by conducting electric current. A voltage drop occurs across the short-circuit device 18 in an on state in accordance with its characteristics.

In other words, the short-circuit device 18 couples the output lines LS3, LS4 with a predefined, albeit small, resistance, and does not completely short-circuit the lines together. "Quasi-shorting" refers to this shorted condition between lines with a small resistance.

The voltage across, and the current flow through, the short-circuit device 18 shorting the lines is termed the ON voltage and the holding current (ON current) respectively.

The short-circuit device 18 for the power supply under consideration here can be, for example, TF321S available from Sanken Electric Co., Ltd. This thyristor has a holding current of 5 mA and a maximum ON voltage (voltage across the device) of 1.4 V.

The second output voltage sensor circuit 17 detects the voltage output (DC output voltage) Vo2 to the second load L2 and turns on/off the short-circuit device 18 on the basis of the detection result.

As discussed in the foregoing, the power supply has one primary circuit FC1 (transformer primary circuit) with the primary winding 13a and two secondary circuits (transformer secondary circuits), one (first secondary circuit SC1) with the first load L1 and the other (second secondary circuit SC2) with the second load L2.

Now, the power supply will be described in terms of operation.

As mentioned previously, the power supply supplies the loads L1, L2 of the secondary circuits SC1, SC2 with the desired constant voltages Vo1, Vo2 (Vo1<Vo2) respectively. The voltages are applied by the switching control circuit 15 in the primary circuit FC1 turning on/off the switching device Q.

Specifically, when the switching device Q is on under the control of the switching control circuit 15 (ON period), the primary winding 13a stores magnetic energy.

When the switching device Q is off under the control of the switching control circuit 15 (OFF period), the first secondary winding 13b of the first secondary circuit SC1 discharges magnetic energy (DC power) which is smoothed by the rectifier diode D1 and the smoothing capacitor C1. The actions produce the first, relatively low electric power (low consumption) output to the first load L1 and at the relatively low voltage Vo1.

When the switching device Q is off, the second secondary winding 13c of the second secondary circuit SC2 discharges DC power which is smoothed by the rectifier diode D2 and the smoothing capacitor C2. The actions produce the second, relatively high electric power (high consumption) output and at the relatively high voltage Vo2a. The output voltage regulator circuit 19 coverts the incoming second electric power to the predefined voltage Vo2, applying it to the second load L2.

In the power supply, the first output voltage sensor circuit 14 of the second secondary circuit SC2 detects the output voltage Vo1 and sends the result to the switching control circuit 15 of the primary circuit FC1. The switching control circuit 15 controls the switching action of the switching device Q according to the magnitude of the output voltage Vo1 to regulate the supply voltage Vo1 to the first load L1 with high precision.

In the primary circuit FC1, the total power sensor circuit 16 measure a voltage drop which is in proportion to the total secondary power and sends the result to the switching control circuit 15. If the switching control circuit 15 has determined that the total secondary power output to the secondary circuits SC1, SC2 reached or exceeded a predefined value, the switching control circuit 15 implements the protective action through the control of the switching device Q, decreasing the total secondary power. The power supply hence provides overcurrent protection to the two secondary circuits SC1, SC2.

Incidentally, as mentioned previously, the power supply has the two secondary circuits SC1, SC2. Therefore, variations in the output current balance between the secondary circuits SC1, SC2 change the output voltages Vo1, Vo2a to the circuits SC1, SC2 (cross-regulation is achieved).

By means of the cross-regulation, the second output voltage sensor circuit 17 and the short-circuit device 18 prevents overcurrent in the first secondary circuit SC1 driven by the first electric power.

Specifically, when the second load L2 has a light load (high resistance) while the first load L1 has a heavy load (low resistance), the output voltage Vo2a increases. Such an increase in the output voltage Vo2a might induce an overcurrent to the first secondary circuit SC1 as a result of the cross-regulation.

Accordingly, in the power supply, an increase in the output voltage Vo2a is detected by the second output voltage sensor circuit 17 which, when the detected value of the output voltage Vo2a has reached or exceeded a predefined value, activates the short-circuit device 18 (turns on the thyristor). Thereafter, the second output voltage sensor circuit 17 allows between the output lines LS3, LS4 for the second load L2 a constant current flow which is equal to the operation current of the short-circuit device 18 (ON current of the thyristor).

In short, the second output voltage sensor circuit 17 is adapted to increase the total secondary power by quasi-shorting the output lines LS3, LS4 together when the output voltage Vo2a has increased.

The switching control circuit 15 by the total power sensor circuit 16 in the primary circuit FC1 is then notified of the increase in the total secondary power. Having determined that the total secondary power has reached or exceeded a predefined value, the switching control circuit 15 implements the protective action through the control of the switching device Q, decreasing the total secondary power. The power supply hence is capable of preventing the electric current flow in the first secondary circuit SC1 from increasing.

As to the protective action, the switching control circuit 15 may stop driving the switching device Q to drop the total secondary power to absolute zero (by terminating a switching operation with latch function). When this is the case, the total secondary power is not output until the user resets the primary circuit FC1 (temporarily cuts off the power supply input).

This prevents the protective action from ceasing due to a behavior of the secondary circuits SC1, SC2 during power supply input (when the primary circuit FC1 is receiving an external electric power input from, for example, the commercial power source 12).

As to the protective action, the switching control circuit 15 may operate to reduce the total secondary power (reduce the secondary output voltages Vo1, Vo2a) in accordance with an increase in the total secondary power (i.e., the current flow through the switching device Q). This behavior of the switching control circuit 15 is termed a "foldback characteristic." When this is the case, minimum electric power supplies to the secondary circuits SC1, SC2 are retained which are necessary to the operation of the first output voltage sensor circuit 14 and the continuous holding current conduction of the short-circuit device 18.

As in the foregoing, the power supply provides reliable overcurrent protection to the first secondary circuit SC1 operating on a relatively low electric power and at a relatively low voltage (the secondary circuit with little effect on the detection result of the total power sensor circuit 16) by means of cross-regulation.

Besides, in the power supply, the protection is realized at low cost by adding the simple construction (the second output voltage sensor circuit 17 and the short-circuit device 18) to the second secondary circuit SC2.

It is worth making a special remark here that the power supply has the output voltage regulator circuit 19 located between the output LS3, LS4 of the second secondary circuit SC2. The output voltage regulator circuit 19 receives the output voltage Vo2a which varies due to the aforementioned cross-regulation, but stably supplies the output voltage Vo2 to the second load L2; Thus, the power supply restrains the variations in the output voltage Vo2 and regulates the voltage with high precision.

In the construction in FIG. 1, the short-circuit device 18 provides overcurrent protection to the first secondary circuit SC1. The protection is, however, possible without use of the short-circuit device 18.

Figure 2:
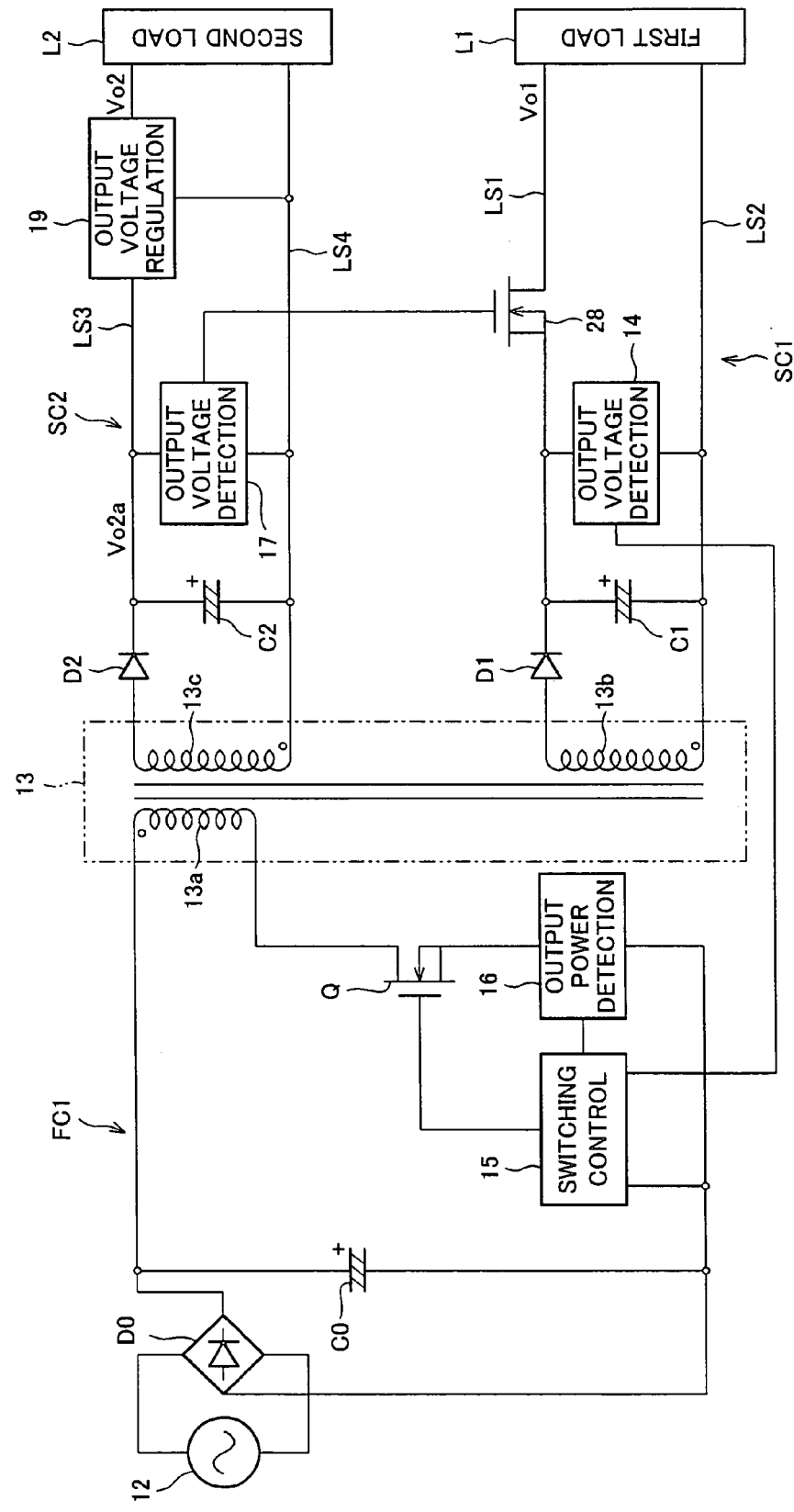
FIG. 2 is a block diagram showing an electrical construction of the switched-mode power supply in FIG. 1, minus the short-circuit device, with a switching device added on one of the output lines to the first load.

FIG. 2 is a block diagram showing an electrical construction of the power supply with no short-circuit, device 18. As shown in the figure, in the construction, there is provided a switching device 28 in series with the first load L1 on the output line LS1. Still referring to FIG. 2, the switching device 28 can be built around a field effect transistor.

In this construction, when the detected value of the output voltage Vo2a has reached or exceeded a predefined value, the second output voltage sensor circuit 17 opens the switching device 28, hence the output line to the first load L1.

As in the foregoing, the power supply in FIG. 2 is again capable of providing reliable overcurrent protection to the first secondary circuit SC1 operating on the second electric power.

Besides, in the construction in FIG. 2, the protection is realized at low cost by merely adding the simple second output voltage sensor circuit 17 and switching device 28 to the secondary circuits SC1, SC2 respectively.

Figure 3:
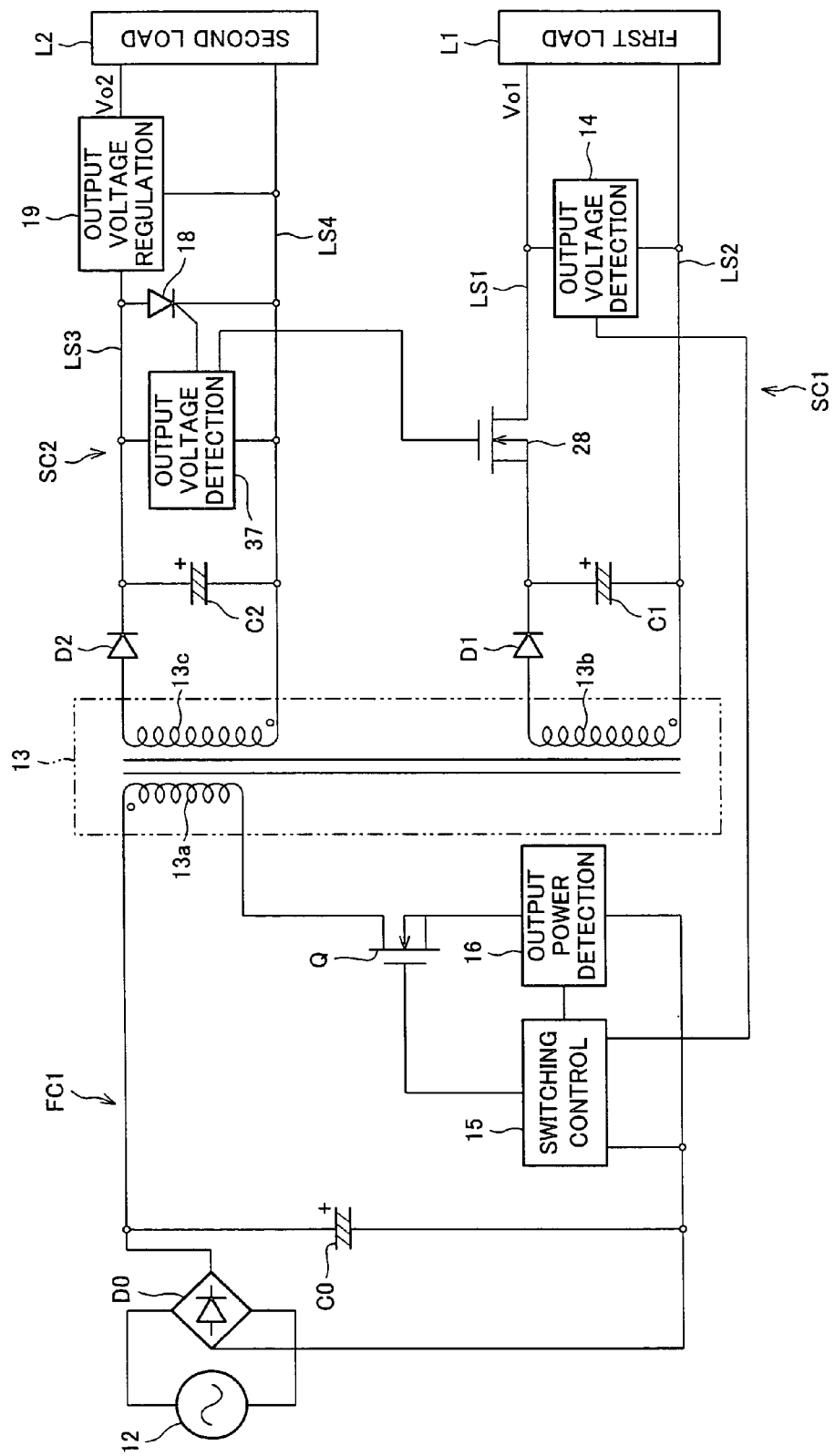
FIG. 3 is a block diagram showing an electrical construction of the switched-mode power supply in FIG. 2, with an additional short-circuit device.

The power supply in FIG. 2 may have an additional short-circuit device 18 as in FIG. 1. FIG. 3 is a block diagram showing an electrical construction of the power supply thus constructed.

According to the construction, when the detected value of the output voltage Vo2a has reached or exceeded a predefined value, the second output voltage sensor circuit 17 activates the short-circuit device 18, thereby quasi-shorting the output line LS3 to the output line LS4, and opens the switching device 28, thereby opening the output line LS1 to the first load L1.

In other words, according to the construction, when an increase in the output voltage Vo2a is detected, the second output voltage sensor circuit 17 first opens the switching device 28 to terminate the output to the first secondary circuit SC1.

The second output voltage sensor circuit 17 further activates the short-circuit device 18 to quasi-short the output lines LS3, LS4, shunting the output to the second load L2. The result is an increased total secondary power. Accordingly, the detected value for the total power sensor circuit 16 of the primary circuit FC1 increases, triggering an output reduction action by the switching control circuit 15.

Here, when the switching device 28 is opened, the voltage Vo1 as detected by the first output voltage sensor circuit 14 located downstream to the switching device 28 decreases. This makes it impossible to implement control through the first output voltage sensor circuit 14, causing the switching control circuit 15 to increase the total secondary power. The increased total secondary power in turn increases the output voltage Vo2a, making the second output voltage sensor circuit 17 capable of reliable detection.

In the construction in FIGS. 1-3, the second secondary circuit SC2 of the power supply has the output voltage regulator circuit 19. The circuit 19, however, is not essential and may be replaced by a resistor.

Figure 4:
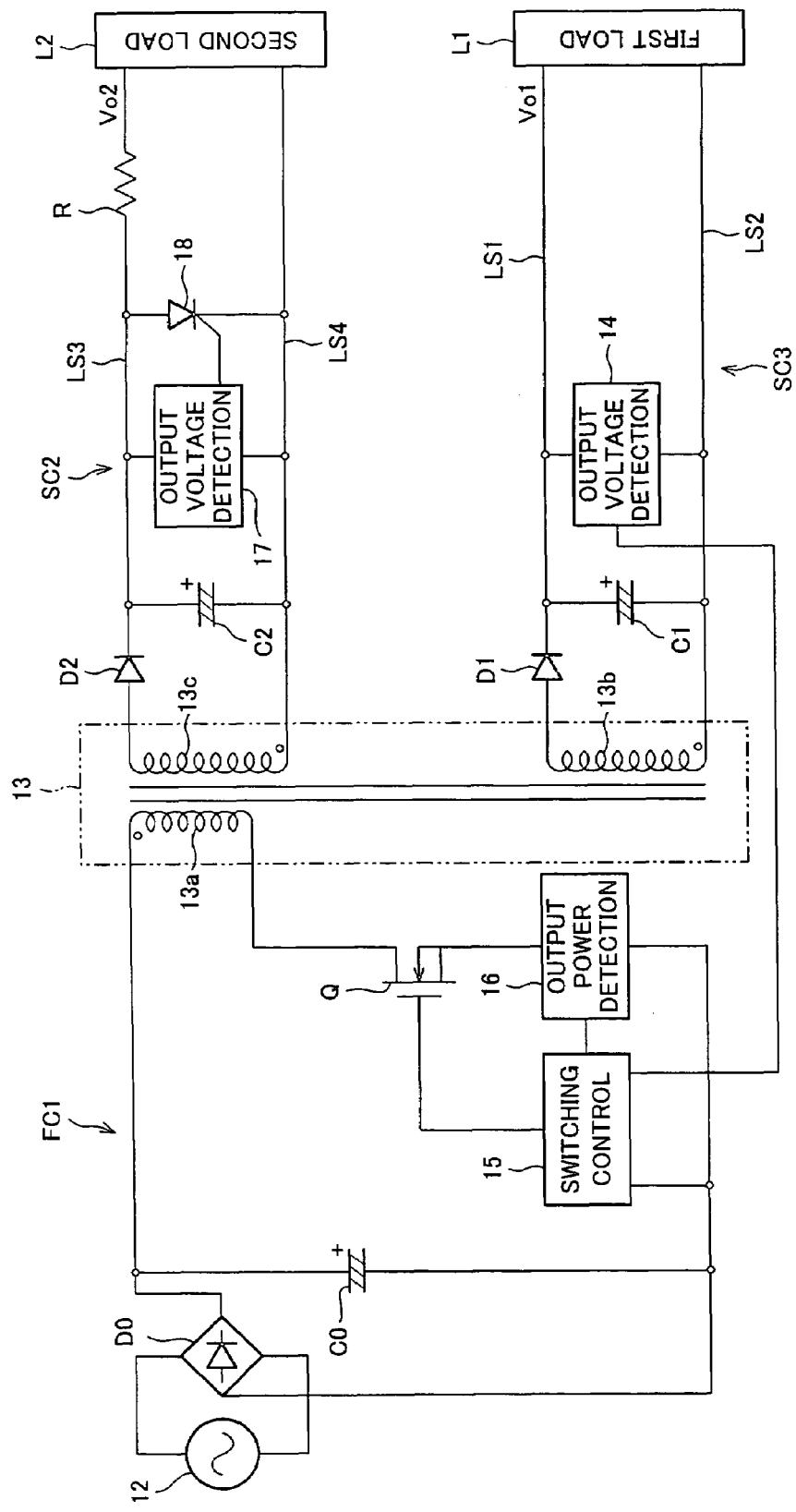
FIG. 4 is a block diagram showing an electrical construction of the switched-mode power supply in FIG. 1, with a resistor added to the second secondary circuit.

FIG. 4 is a block diagram showing an electrical construction of the power supply in FIG. 1, with the circuit 19 replaced by a resistor R on the output line LS3 of the second secondary circuit SC2. According to the construction, the resistor R is interposed between the short-circuit device 18 and the second load L2 and in series with the second load L2.

According to the construction, shorting out the second load L2 leaves the resistor R connected in parallel with the short-circuit device 18. Therefore, even if the second load L2 is shorted out in a protective action, a holding current required to retain the quasi-shorted condition can be applied to the short-circuit device 18 (a high current can be prevented from flowing to the second load L2). In short, the resistor R is capable of preventing the short-circuit device 18 from terminating quasi-shorting due to the shorting of the second load L2.

Figure 5:
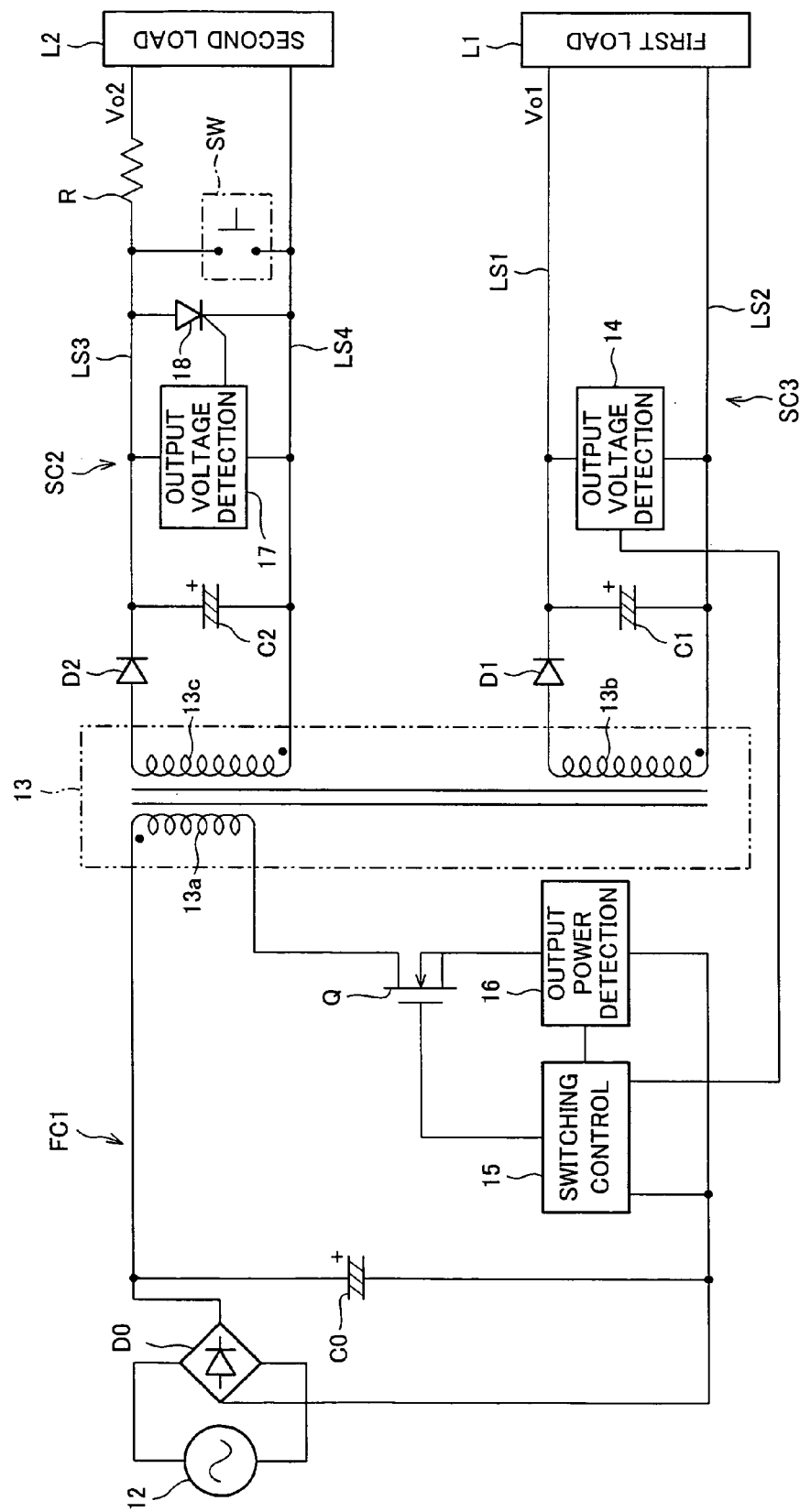
FIG. 5 is a block diagram showing an electrical construction of the switched-mode power supply in FIG. 4, with a switching device (e.g., a pushbutton switch) added in parallel with the short-circuit device.
Figure 6:
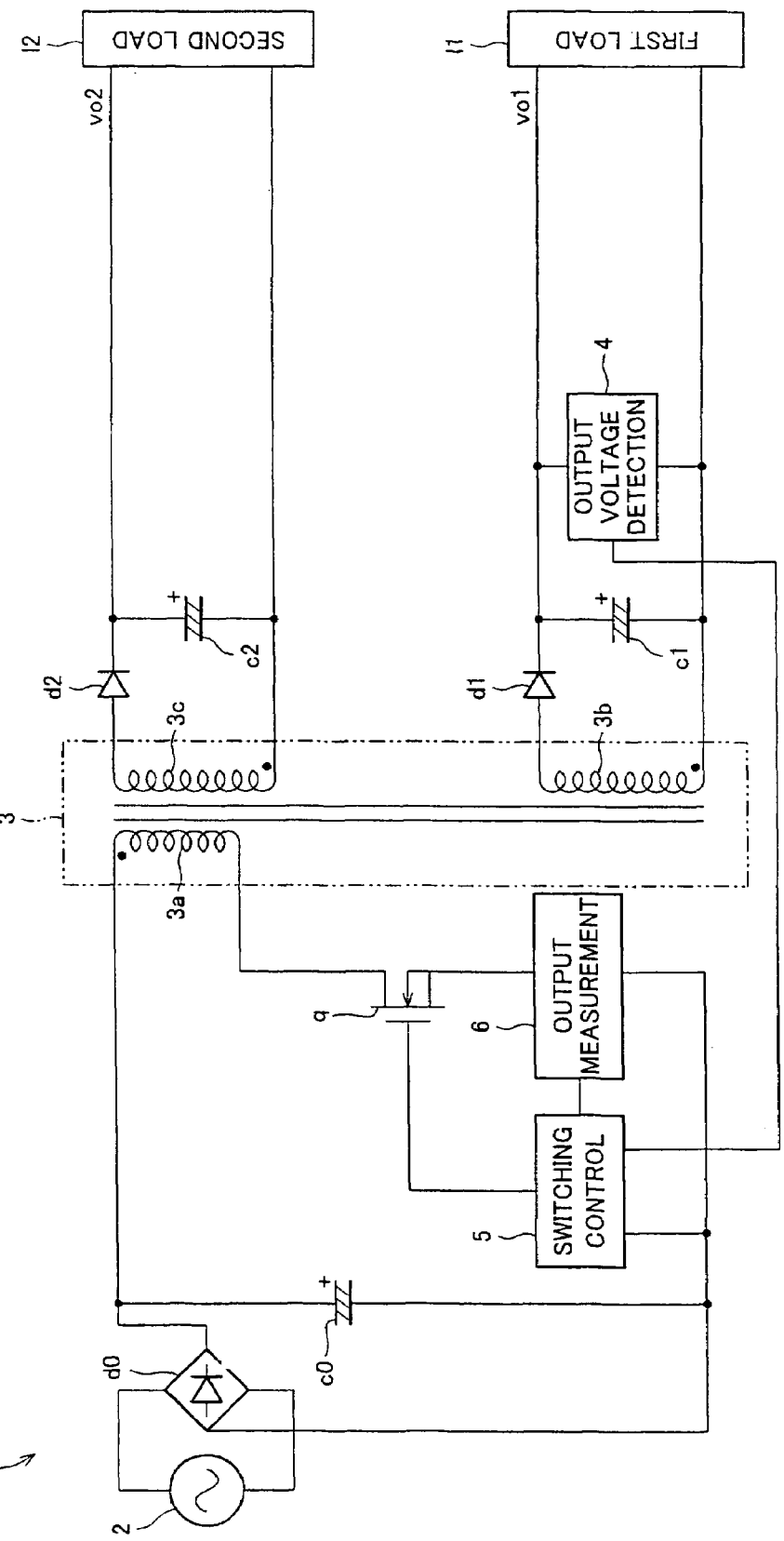
FIG. 6 is a block diagram showing the electrical construction of a typical conventional switched-mode power supply.

Now, referring to FIG. 5, a switching device SW built around, for example, a pushbutton switch, may be provided in parallel with the short-circuit device 18 on top of the construction in FIG. 4. According to the construction, the switching device SW completely shorts the terminals of the short-circuit device 18 together to provide a shunt to the holding current, causing the short-circuit device 18 to terminate quasi-shorting.

In other words, the construction is capable of terminating a protective action by eliminating the cause for the overcurrent in the first load L1 in the protective action and subsequently activating the switching device SW for a short time to completely short the terminals of the short-circuit device 18.

The switching device SW may be operated manually by the user or using the switching control circuit 15 or a similar control section (computer).

In the present embodiment, the switched-mode power supply 11 runs on an AC power from the commercial power source 12; however, the power supply 11 may instead run on a battery or other DC power source.

In the present embodiment, the total power sensor circuit 16 is adapted to measure the voltage drop across the resistor (not shown in the figure) connected in series with the switching device Q; however, the total power sensor circuit 16 may instead be modified to measure any amount which changes in accordance with the total power output to the secondary circuits SC1, SC2.

In the present embodiment, the short-circuit device 18 is made up of a thyristor; however, the short-circuit device 18 may instead made of any component provided that it is capable of quasi-shorting the output line LS3 to LS4 under the control of the second output voltage sensor circuit 17.

In the present embodiment, the power supply includes two secondary circuits; however, the power supply may instead include three or more secondary circuits. When this is the case, if the second output voltage sensor circuit 17 has detected an increase in the output voltage Vo2a for the first secondary circuit SC1, the short-circuit device 18 and other components act to decrease the output electric powers to all the other secondary circuits. As in the previous examples, it is also preferred here if the first secondary circuit SC1 is supplied with a relatively high electric power (high power consumption) and at a relatively high voltage in comparison with the other secondary circuits.

In the present embodiment, the first secondary circuit SC1 is supplied with an electric power and at a relatively high voltage, while the second secondary circuit SC2 is supplied with an electric power and at a relatively low voltage. However, the secondary circuits in the power supply may be supplied with substantially equal voltages. When this is the case, any one of the secondary circuits will act as the first secondary circuit.

In addition, the power supply may receive an AC power from, for example, a commercial power source 12 via an AC input thereof, and convert it to a DC power voltage using a rectifier diode D0 and a smoothing capacitor C0, to produce an operational power for the power supply. In addition, it may be said that in the power supply, the primary winding 13a and the switching device Q connected in series in the transformer 13 are connected across the smoothing capacitor C0, and the magnetic energy stored in the primary winding 13a in the switching device Q's ON period is drawn from the first secondary winding 13b in the transformer 13 through the rectifier diode D1 in an OFF period and smoothed by the smoothing capacitor C1, to obtain a DC power and at a voltage Vo1 for the first, relatively low voltage, low power consumption load L1. Hence, the DC output voltage Vo1 is detected by the output voltage sensor circuit 14 and fed back to the primary-side switching control circuit 15 through, for example, a photocoupler (not shown in the figure) provided for insulating purposes; by so doing, the supply voltage Vo1 to the first load L1 is regulated through switching control in accordance with the magnitude of the output voltage Vo1 with high precision. In addition, the total power sensor circuit 16 may be termed the output value sensor circuit 16.

In addition, it is worth making a special remark in relation to the power supply shown in FIG. 1 that the output voltage sensor circuit 17 detecting the output voltage Vo2a is located between the output lines to the relatively high voltage, high output second load L2, and the short-circuit device 18 quasi-shorting the output lines when the voltage Vo2a as detected by the output voltage sensor circuit 17 reaches or exceeds a predefined value is provided.

In addition, in the power supply, the output voltage sensor circuit 17 detects an increase in the output voltage Vo2a by cross-regulation when the second load L2 is light, and the first load L1 is heavy, activates the short-circuit device 18 (turns on the thyristor) when it reaches the predefined value, and thereafter, continuously cause a constant current flow between the output lines for the second load L2 in the form of operational current for the short-circuit device 18 (ON current for the thyristor). This creates a quasi-shorted condition, increasing the total secondary power and causing the primary-side total power sensor circuit 16 to implement an overcurrent restriction action, the switching control circuit 15 to decrease the output to protect the secondary circuit for the first load L1.

As to the protective action by the switching control circuit 15, the output reduction as a result of the overcurrent restriction action may be replaced by the termination of a switching operation with a latch function. When this is the case, the risk is prevented of terminating the protective action during a power supply input due to activation of a secondary.

In addition, the switching control circuit 15 may have a foldback characteristic where the secondary output voltages Vo1, Vo2a decrease with an increase in an output current in accordance with the detection result from the total power sensor circuit 16. When this is the case, a minimum electric power can be continuously applied which is required to retain the secondary-side overcurrent protection.

In addition, it can be said in relation to the power supply that when the transformer 13 has multiple secondary circuits, a reliable overcurrent protect capability of the relatively low voltage, low output one of the secondary circuits, that is, the one for the first load L1 with little effect on the overcurrent detection result in the total power sensor circuit 16, can be achieved at low cost by means of cross-regulation where the output voltages Vo1, Vo2a change in response to the balance between the output currents by merely adding a simple arrangement including the output voltage sensor circuit 17 and the short-circuit device 18 to the relatively high voltage, high output secondary circuit on the second load L2.

In addition, it is worth making a special remark in relation to the power supply shown in FIG. 1 that together with high precision adjustment of the voltage Vo1 through the control of the feedback to the switching control circuit 15 of the voltage Vo1 as detected by the output voltage sensor circuit 14 in the secondary circuit for the first load L1, the additional output voltage regulator circuit 19 is also provided in the secondary circuit for the second load L2 between the output voltage sensor circuit 17 and the second load L2 to regulate the second output voltage Vo2a which varies due to the cross-regulation. Even when high precision is required with the second high output voltage Vo2a, its variations can be restricted.

In addition, it can be said that in the construction in FIG. 1, an overcurrent restriction action is implemented for the first secondary circuit through the overcurrent restriction action by the total power sensor circuit 16 where the short-circuit device 18 is quasi-shorts.

In addition, it can be said that in the construction in FIG. 1, an overcurrent restriction action is implemented for the secondary circuit for the first load L1 through the overcurrent restriction action by the total power sensor circuit 16 where the short-circuit device 18 quasi-shorts, whereas in the construction in FIG. 2, the switching device 28 is interposed in series on an output line to the first load L1, and the output line to the first load L1 is opened when the voltage as detected by the output voltage sensor circuit 17 reaches or exceeds the predefined value. In this manner, when the transformer 13 has multiple secondary circuits, a reliable overcurrent protect capability of the relatively low voltage, low output one of the secondary circuits, that is, the one for the first load L1 with little effect on the overcurrent detection result in the total power sensor circuit 16, can be achieved at low cost by means of cross-regulation where the output voltages Vo1, Vo2a change in response to the balance between the output currents by merely adding the output voltage sensor circuit 17 and the switching device 28 (a simple arrangement) to the relatively high voltage, high output second load L2 side and the first load L1 thereof respectively.

In addition, it is worth making a special remark in relation to the construction in FIG. 2 that the switching device 28 is interposed in series on an output line to the first load L1, and the output line to the first load L1 is opened when the voltage as detected by the second output voltage sensor circuit 17 reaches or exceeds the predefined value. In this switched-mode power supply 21, the switching device 28 is represented by a field effect transistor. In this manner, when the transformer 13 has multiple secondary circuits, a reliable overcurrent protect capability of the relatively low voltage, low output one of the secondary circuits, that is, the one for the first load L1 with little effect on the overcurrent detection result in the total power sensor circuit 16, can be achieved at low cost by means of cross-regulation where the output voltages Vo1, Vo2a change in response to the balance between the output current by merely adding the second output voltage sensor circuit 17 and the switching device 28 (a simple arrangement) to the relatively high voltage, high output second load L2 and the first load L1 thereof respectively.

In addition, it is worth making a special remark in relation to the construction in FIG. 3 that in the switched-mode power supply, if the voltage Vo2a as detected by the output voltage sensor circuit 17 for the high voltage, high output second load L2 reaches or exceeds the predefined value, the short-circuit device 18 for the second load L2 quasi-shorts, and the switching device 28 for the low voltage, low output first load L1 opens an output line to the first load L1. Therefore, when the output voltage sensor circuit 17 has determined a rise in the output voltage Vo2a to the secondary circuit for the high voltage, high output second load L2, a protective action is first implemented by the switching device 28 opening and thereby terminating the output to the secondary circuit for the low voltage, low output first load L1. Then, the short-circuit device 18 is activated to quasi-short the output to the second load L2, increasing the total secondary power and thus activating the primary-side total power sensor circuit 16 to decrease the output by means of the switching control circuit 15 to implement protection.

Here, when the switching device 28 is opened, the voltage Vo1 as detected by the output voltage sensor circuit 14 located downstream to the switching device 28 decreases; therefore, the constant voltage operation by the switching control circuit 15 becomes impossible to control, the output voltage Vo2a rises, and the detection by the output voltage sensor circuit 37 is ensured.

In addition, it is worth making a special remark in relation to the construction in FIG. 3 that when the short-circuit device 18 is made of a thyristor, a resistor R is connected in series in the secondary circuit for the high voltage, high output second load L2 between the thyristor 18 and the second load L2, and the second load L2 has been shorted out in a protective action, the holding current required for the thyristor 18 to retain the quasi-shorted condition of the thyristor 18 from flowing into the second load L2. Thus, the thyristor 18 can be prevented from terminating the quasi-shorted condition due to the shorting of the second load L2.

In addition, it is worth making a special remark in relation to the construction in FIG. 5 that in the secondary circuit for the high voltage, high output second load L2, when the second load L2 has been shorted, the holding current for the thyristor 18 is secured using the resistor R, to prevent the thyristor 18 from terminating the quasi-shorted condition, and the switching device SW completely shorting the terminals of the thyristor 18 together is provided to shunt the holding current to terminate the quasi-shorted condition. In addition, the switching device SW is made of, for example, a pushbutton switch, and a protective action can be terminated by eliminating the cause for the overcurrent in the first load L1 in the protective action and subsequently activating the switching device SW for a short time to completely short the terminals of the short-circuit device 18.

The switched-mode power supply in accordance with the present invention may be depicted as the following first to tenth switched-mode power supplies. The first switched-mode power supply is a switched-mode power supply where: a switching device turns on/off a DC input obtained by rectifying and smoothing a DC or AC input; and multiple secondary circuits transform the AC to DC via a transformer to feed respective loads, and includes: output voltage sensor means for detecting an output voltage to a relatively high-voltage secondary circuit; and output limiting means for limiting an output to a relatively low-voltage secondary circuit when the detected voltage from the output voltage sensor means is more than or equal to a predefined value.

The arrangement is simple, unlike the arrangement where in a switched-mode power supply including multiple secondary circuits, a separate current sensor circuit is provided to each output of the secondaries to terminate or control the outputs independently from each other or notify to the primary to terminate or control the outputs, based on the detected current values.

The arrangement includes output voltage sensor means in a relatively high-voltage secondary circuit, and output limiting means decreasing or terminating the output from the a relatively low-voltage secondary circuit when the detected voltage from the output voltage sensor means becomes more than or equal to a predefined value.

Therefore, a reliable overcurrent protection can be implemented at low cost on the relatively low-voltage output secondary circuit, i.e., the one with less effect on overcurrent protection by means of cross-regulation where the output voltages change in response to the balance among the output currents when the transformer has multiple secondary circuits as mentioned previously, only by adding a simple arrangement.

The second switched-mode power supply, in the arrangement of the first switched-mode power supply, has an arrangement where the output limiting means is arranged to include output amount sensor means for measuring the output current from the switching device; control means for controlling the turning on/off of the switching device in response to a detection result from the output amount sensor means; and short-circuit means, provided between output lines of the relatively high-voltage secondary circuit, for quasi-shorting the output lines together when the detected voltage from the output voltage sensor means becomes more than or equal to a predefined value.

According to the arrangement, in a switched-mode power supply implementing overcurrent control using a simple arrangement including output amount sensor means for measuring an output current amount from the switching device in the primary, there is provided, in the relatively high-voltage secondary circuit, short-circuit means realized by the output voltage sensor means, a thyristor, etc. which causes the control means to increases the load of the secondary circuit by quasi-shorting the output lines for the secondary circuit together to implement overcurrent protection when the detected voltage from the output voltage sensor means becomes more than or equal to a predefined value.

Therefore, a reliable overcurrent protection can be implemented at low cost on the relatively low-voltage output secondary circuit, i.e., the one with less effect on overcurrent protection in output amount sensor means by means of cross-regulation where the output voltages change in response to the balance among the output currents when the transformer has multiple secondary circuits as mentioned previously, only by adding a simple arrangement of the output voltage sensor means and the short-circuit means to the relatively high-voltage secondary circuit.

The third switched-mode power supply, in the arrangement of the first switched-mode power supply, has an arrangement where the output limiting means is a switching device, provided in series between the output lines of the relatively low-voltage secondary circuit, for blocking the output lines of the secondary circuit when the detected voltage from the output voltage sensor means becomes more than or equal to a predefined value.

According to the arrangement, a switching device is provided in series with the output lines in the relatively low-voltage secondary circuit, and the switching device blocks the output lines when the detected voltage from the output voltage sensor means becomes more than or equal to a predefined value.

Therefore, a reliable overcurrent protection can be implemented at low cost on the relatively low-voltage secondary circuit, e., the one with less effect on overcurrent protection by means of cross-regulation where the output voltages change in response to the balance among the output currents when the transformer has multiple secondary circuits as mentioned previously, only by adding a simple arrangement of the output voltage sensor means and the switching device respectively to the high-voltage secondary circuit and the low-voltage secondary circuit.

The fourth switched-mode power supply, in the arrangement of the first switched-mode power supply, is such that the output limiting means is arranged to include: output amount sensor means for measuring the output current amount from the switching device; control means for controlling the turning on/off of the switching device in response to a detection result from the output amount sensor means; short-circuit means, provided between the output lines of the relatively high-voltage secondary circuit, for quasi-shorting the power supply lines together when the detected voltage from the output voltage sensor means becomes more than or equal to a predefined value; and a switching device, provided in series between the output lines of the relatively low-voltage secondary circuit, for blocking the output lines of the secondary circuit when the detected voltage from the output voltage sensor means becomes more than or equal to a predefined value.

According to the arrangement, in a switched-mode power supply implementing overcurrent control using a simple arrangement including output amount sensor means for measuring an output current amount from the switching device in the primary, there is provided, in the relatively high-voltage secondary circuit, short-circuit means realized by the output voltage sensor means, a thyristor, etc. which causes quasi-shorting the output lines for the secondary circuit together to implement overcurrent protection when the detected voltage from the output voltage sensor means becomes more than or equal to a predefined value. In addition, the output lines of the relatively low-voltage secondary circuit includes a switching device for blocking the output lines of the secondary circuit when the detected voltage from the output voltage sensor means becomes more than or equal to a predefined value.

Therefore, when the output voltage sensor means determines a rise in the output voltage from the high-voltage secondary circuit, the output from the low-voltage secondary circuit is terminated by opening the switching device to terminate a constant voltage control operation of the primary, and the output from the high-voltage secondary circuit is quasi-shorted. As a result, the secondary output voltage rises, and the protection detection operation more surely works.

The fifth switched-mode power supply is, in any one of the arrangements of the first to fourth switched-mode power supply, arranged to include other output voltage sensor means in the relatively low-voltage secondary circuit, wherein the output voltage from the low-voltage secondary circuit is regulated at a desired value by the control means controlling the turning on/off of the switching device based on the detected voltage.

According to the arrangement, multiple secondary circuits are included, a low-voltage one of the secondary circuits has other output voltage sensor means, the detected voltage is provided as a feedback to the control means, and the control means controls the turning on/off of the switching device in accordance with the detected voltage. Therefore, the output voltage from the low-voltage secondary circuit can be adjusted with high precision.

The sixth switched-mode power supply is, in the arrangement of the fifth switched-mode power supply, arranged to further include output voltage regulating means between the output voltage sensor means and the load in the relatively high-voltage secondary circuit. According to the arrangement, variations in the output voltage from the high-voltage secondary circuit can also be limited.

The seventh switched-mode power supply is, in the arrangement of the second or fourth switched-mode power supply, such that the control means is arranged to include a circuit having a foldback characteristic where the secondary output voltage is reduced according to the detection result from the output amount sensor means when the output current increases. According to the arrangement, a minimum electric power can be continuously supplied which is required to hold the overcurrent protection operation by the secondary.

The eighth switched-mode power supply is, in the arrangement of the second or fourth switched-mode power supply, such that the control means is arranged to include a circuit having a latch function where when the output current has increased, the primary output is terminated according to a detection result from the output amount sensor means and reverts to a previous condition when the power supply is connected again. According to the arrangement, it becomes possible to avoid protection stoppage due to a secondary's operation during a protective action with the power supply connected.

The ninth switched-mode power supply is, in the arrangement of the second or fourth switched-mode power supply, is such that the short-circuit means is made up of a thyristor and is arranged to further include a resistor between the output voltage sensor means and the load in the relatively high-voltage secondary circuit, the resistor preventing the holding current required by the thyristor to remain in a quasi-short condition from flowing into the load when the load is shorted out during a protective action.

According to the arrangement, when the load for the high-voltage secondary circuit is shorted out during a protective action, the resistor prevents the holding current required by the thyristor to remain in a quasi-short condition from flowing into the load. This avoids the thyristor from stopping being quasi-shorted due to the shorting of the load.

The tenth switched-mode power supply is, in the arrangement of the ninth switched-mode power supply, arranged to include a switching device, provided in parallel with the thyristor, for completely shorting the terminals of the thyristor.

According to the arrangement, when the load in the high-voltage secondary circuit is shorted out during a protective action, the resistor prevents the holding current required by the thyristor to remain in a quasi-short condition from flowing into the load. This avoids the thyristor from stopping being quasi-shorted due to the shorting of the load. After the cause for overcurrent is removed, the switching device is activated for a short time to completely short the terminals of the thyristor to provide a function to terminate a protective action.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A switched-mode power supply comprising:
   a primary circuit including a primary winding and a switching device, the primary winding constituting a part of a transformer;
   a plurality of secondary circuits each including a secondary winding and a load, the secondary windings constituting a part of the transformer, the switching device turning on/off an electric power supply to the primary winding to produce secondary electric powers applied from the plurality of secondary windings to the loads,
   a specified-voltage sensor section for detecting an output voltage from only a specified one of the secondary circuits; and
   an output limiting section for limiting an electric power output to at least one non-specified secondary circuit of the plurality of secondary circuits when the specified-voltage sensor section has detected a voltage being more than or equal to a first predefined value in the specified secondary circuit, wherein
   the output limiting section includes:
      a total power sensor section for detecting a value in accordance with a total secondary power which is a sum of power outputs to all the secondary circuits;
      a control section for controlling turning on/off of the switching device in accordance with a detection result from the total power sensor section;
      a short-circuit section, including a thyristor, provided between output lines for the specified secondary circuit, for quasi-shorting the output lines together when the specified-voltage sensor section has detected the voltage being more than or equal to the first predefined value,
   wherein the specified secondary circuit includes a resistor between the specified-voltage sensor section and the load, and
   wherein a holding current required for the thyristor to be quasi-shorted is retained flowing through the thyristor even when the load for the specified secondary circuit is shorted out.

2. The switched-mode power supply as defined in claim 1, wherein
   the specified secondary circuit is supplied with a voltage level that is higher than the at least one non-specified secondary circuit.

3. The switched-mode power supply as defined in claim 1, wherein
   the total power sensor section is adapted to measure a current flow through the switching device.

4. The switched-mode power supply as defined in claim 1, wherein
   the output limiting section includes a second switching device, provided in series between output lines for the at least one non-specified secondary circuit, for opening the output lines when the specified-voltage sensor section has detected the voltage being more than or equal to the first predefined value.

5. The switched-mode power supply as defined in claim 1, wherein
   the output limiting section includes a second switching device, provided in series between output lines for the at least one non-specified secondary circuit, for opening the output lines when the specified-voltage sensor section has detected the voltage being more than or equal to the first predefined value.

6. The switched-mode power supply as defined in claim 1, further comprising a non-specified output voltage sensor section for detecting an output voltage from the at least one non-specified secondary circuit, wherein
   a control section controls turning on/off of the switching device based on a detection result from the non-specified output voltage sensor section, to regulate the output voltage at a desired value.

7. The switched-mode power supply as defined in claim 6, wherein
   the specified secondary circuit includes an output voltage regulator section between the specified-voltage sensor section and the load.

8. The switched-mode power supply as defined in claim 1, wherein
   the control section is adapted to reduce the total secondary power when the detection result from the total power sensor section indicates that the total secondary power is more than or equal to a second predefined value.

9. The switched-mode power supply as defined in claim 1, wherein the control section includes a circuit with a latch function which stops driving the switching device when the detection result from the total power sensor section indicates that the total secondary power is more than or equal to a second predefined value and which reverts to a previous condition when an electric power is restored.

10. The switched-mode power supply as defined in claim 1, further comprising a second switching device, provided in parallel with the thyristor, for completely shorting terminals of the thyristor together.

* * * * *